( 12 ) United States Patent
Ito

(10) Patent No.: US 9,641,109 B2
(45) Date of Patent: May 2, 2017

(54) DRIVE CIRCUIT FOR BRUSHLESS DC MOTOR

(71) Applicant: KOKUSAI DISPLAY KOGYO CO., LTD., Tokyo (JP)

(72) Inventor: Reijiro Ito, Tokyo (JP)

(73) Assignee: KOKUSAI DISPLAY KOGYO CO., LTD., Tokyo (JP)

( * ) Notice: Subject to any disclaimer, the term of this patent is extended or adjusted under 35 U.S.C. 154(b) by 532 days.

(21) Appl. No.: 14/368,881

(22) PCT Filed: Apr. 15, 2014

(86) PCT No.: PCT/JP2014/060680
§ 371 (c)(1),
(2) Date: Jun. 26, 2014

(87) PCT Pub. No.: WO2015/159358
PCT Pub. Date: Oct. 22, 2015

(65) Prior Publication Data
US 2016/0301339 A1  Oct. 13, 2016

(51) Int. Cl.
*H02P 1/00* (2006.01)
*H02P 6/20* (2016.01)
(Continued)

(52) U.S. Cl.
CPC ............... *H02P 6/20* (2013.01); *H02K 11/28* (2016.01); *H02K 11/33* (2016.01); *H02K 21/14* (2013.01);
(Continued)

(58) Field of Classification Search
CPC ................................ H02P 2207/05; H02P 6/16
See application file for complete search history.

(56) References Cited

U.S. PATENT DOCUMENTS

| 3,523,230 A * | 8/1970 | York | G05B 19/40 |
| | | | 318/400.02 |
| 2007/0138994 A1* | 6/2007 | Hsieh | H02P 29/50 |
| | | | 318/800 |

FOREIGN PATENT DOCUMENTS

| DE | 1274999 B2 | 8/1968 |
| JP | 39-20410 | 9/1939 |

(Continued)

OTHER PUBLICATIONS

International Search Report and Written Opinion dated Jun. 24, 2014 for Application No. PCT/JP2014/060680.
(Continued)

*Primary Examiner* — Shawki S Ismail
*Assistant Examiner* — Zoheb Imtiaz
(74) *Attorney, Agent, or Firm* — Frost Brown Todd LLC

(57) ABSTRACT

To provide a brushless DC motor drive circuit operating with low electric power without a hall element, etc., and to provide a drive circuit for brushless DC motor which may be generally started regardless of an amount of load or size of inertia moment.

The drive circuit comprises a two-stage amplifying circuit comprised of transistors 13 and 14 for switching and amplifying a drive current to drive coils 11; a detecting coil 15 disposed together with the drive coils in a magnetic field of permanent magnets in a rotor, and connected to a base of the transistor 14 at one end; and a diode connected in series with the other end of the detecting coil 15 and provided between the base and an emitter of the transistor 14, wherein the diode controls and adjusts a base current of the transistor 14 such that the transistor 14 is turned on when induced electromotive force generated in the detecting coil 15 is a
(Continued)

reverse voltage, and such that the transistor 14 is turned off when the induced electromotive force of the detecting coil 15 is a forward voltage.

2 Claims, 16 Drawing Sheets

(51) Int. Cl.
    *H02P 1/46*       (2006.01)
    *H02P 6/182*     (2016.01)
    *H02K 21/24*     (2006.01)
    *H02K 29/12*     (2006.01)
    *H02K 11/28*     (2016.01)
    *H02K 11/33*     (2016.01)
    *H02K 21/14*     (2006.01)

(52) U.S. Cl.
    CPC .............. *H02K 21/24* (2013.01); *H02K 29/12* (2013.01); *H02P 1/46* (2013.01); *H02P 6/182* (2013.01)

(56) References Cited

FOREIGN PATENT DOCUMENTS

| JP | 47-33716 Y1 | 10/1972 |
| JP | 50-144016 A | 11/1975 |
| JP | 56-156398 | 11/1981 |
| JP | 7-72812 A | 3/1995 |

OTHER PUBLICATIONS

English Translation of relevant excerpt from International Search Report dated Jun. 24, 2014 for Application No. PCT/JP2014/060680.
English Translation of relevant excerpt from Written Opinion dated Jun. 24, 2014 for Application No. PCT/JP2014/060680.
Hagino, Hiroshi, 'Brushless DC Motor' Ohmsha, Ltd., Jul. 2003 (with partial English translation).
English Abstract for Application No. JP 39-20410.

\* cited by examiner (a)

(b)

(c)

DRIVE CIRCUIT FOR BRUSHLESS DC MOTOR

TECHNICAL FIELD

The present invention relates to a brushless DC motor drive circuit and a brushless DC motor using a direct current power source such as a dry cell battery, and specifically relates to a drive circuit which utilizes induced electromotive force of a detecting coil associated with rotation of a rotor having permanent magnets for the control of energization to a drive coil.

BACKGROUND ART

Conventionally, there has been a brushless DC motor excluding physical contact of a brush by detecting a position of a magnet of a rotor with a hall element magnetic sensor and controlling energization to a coil with an electronic circuit. As for such a brushless DC motor, Non-patent document 1 provides, on page 91, a circuit diagram of a drive circuit shown in FIG. 15A. The circuit of this dual-phase bidirectional energization drive type brushless DC motor comprises two hall elements 202 at both inputs of two dual-phase push-pull circuits, which are arranged with their phase positions offset. By detecting the position of the rotor by respective hall elements 202, the energization to respective drive coils 201 arranged with their phases shifted may be controlled.

On the other hand, Patent document 1 describes, as shown in FIG. 15B, a circuit comprising a rotor 1 having permanent magnets magnetized to have N and S magnetic poles; a detecting coil 3; a drive coil 2; and a transistor 5 controlling a drive current, wherein electromotive force of the detecting coil 3 controls the drive current to the drive coil 2.

PRIOR ART DOCUMENTS

Non-Patent Document

Non-patent document 1: Hagino, Hiroshi, "Brushless DC Motor", published by Ohmsha, Ltd., July, 2003

Patent Document

Patent document 1: Japanese Examined Patent Application Publication 39-20410

SUMMARY OF THE INVENTION

Problems to be Solved by the Invention

In the drive circuit (FIG. 15A) shown in Non-patent document 1, currents shown by Ih in this Figure (an input current for obtaining about 100 mV of hall element output voltage is 5-10 mA: thus, twice the current, 10-20 mA, due to dual-phase) are required to operate the hall elements 202. The consumption current is significantly greater than, for example, the practical generation current for an indoor solar cell, 0.1-2 mA. Thus, it cannot be used to solve the problem of the driving of a brushless DC motor with such a small solar cell.

In the circuit shown in Patent document 1, when it is powered on, a starting capacitor 6 connected to a base of the transistor 5 turns on (starts) the transistor 5 (FIG. 15B). However, if the capacity of the starting capacitor 6 is excessive, and the transistor 5 is turned on in an unnecessarily continuous fashion, the current continues to flow to the drive coil 2, which may inhibit rotation of the rotor 1 (failure of start-up). Conversely, if the capacity (or amount of charge) of the starting capacitor 6 is small, and a friction load or inertial load of the rotor 1 is large, sufficient rotation may not be achieved (failure of start-up).

If an inertia moment of load, friction load, and acceleration at the time of motor start-up are constant, these problems may be solved by setting appropriate capacity for the capacitor. However, changing the capacitor capacity to the load, and changing the drive coil energization time upon the start-up are inadequate for a general-purpose motor. Thus, there is a need for a starting circuit which may be widely used regardless of an amount of load or size of inertia moment.

In view of the above, the present invention aims to provide a drive circuit for a brushless DC motor which operates with low electric power without a hall element, etc., and to provide a drive circuit for a brushless DC motor which may be generally started regardless of an amount of load, etc.

Means for Solving the Problem (Arrangement 1)

A brushless DC motor drive circuit comprising:

a drive coil positioned in a magnetic field of permanent magnets provided in a rotor;

a direct current power source supplying drive power to the drive coil;

a first transistor that is emitter-grounded, in which a collector is connected to the drive coil;

a second transistor that is emitter-grounded, in which a collector is connected to a base of the first transistor;

a base current controlling resistor adjusting a base current of the second transistor;

a detecting coil positioned in a magnetic field of the permanent magnets and provided between a base and an emitter of the second transistor; and a diode connected between the base and emitter of the second transistor in series with the detecting coil and provided in a forward direction running parallel to a current between the base and emitter of the second transistor, wherein the diode controls and adjusts the base current of the second transistor such that the second transistor is turned on when a reverse voltage is applied by induced electromotive force generated in the detecting coil and such that the second transistor is turned off when a forward voltage is applied by the induced electromotive force of the detecting coil.

(Arrangement 2)

The brushless DC motor drive circuit of Arrangement 1, wherein the first transistor is a PNP type transistor, and the second transistor is an NPN type transistor; and wherein an anode of the diode is connected to the base of the second transistor, a cathode of the diode is connected to one end of the detecting coil, and the other end of the detecting coil is connected to the emitter of the second transistor.

(Arrangement 3)

The brushless DC motor drive circuit of Arrangement 1, wherein the first transistor is an NPN type transistor, and the second transistor is a PNP type transistor; and wherein a cathode of the diode is connected to the base of the second transistor, an anode of the diode is connected to one end of the detecting coil, and the other end of the detecting coil is connected to the emitter of the second transistor.

(Arrangement 4)

A brushless DC motor drive circuit comprising:

a first direct current power source and a second direct current power source connected in series;

a drive coil positioned in a magnetic field of permanent magnets provided in a rotor, wherein one end of the drive coil is connected between the first and second direct current power sources;

a first transistor that is a PNP type transistor, wherein an emitter is connected to the positive side of the first direct current power source, and a collector is connected to the other end of the drive coil;

a second transistor that is an NPN type transistor, wherein an emitter is connected between the first and second direct current power sources, and a collector is connected to a base of the first transistor;

a first base current controlling resistor adjusting a base current of the second transistor;

a detecting coil positioned in a magnetic field of the permanent magnets and provided between a base and an emitter of the second transistor;

a first diode in which an anode is connected to the base of the second transistor and a cathode is connected to the detecting coil, wherein the first diode controls and adjusts the base current of the second transistor such that the second transistor is turned on when a reverse voltage is applied by induced electromotive force generated in the detecting coil and such that the second transistor is turned off when a forward voltage is applied by the induced electromotive force of the detecting coil;

a third transistor that is an NPN type transistor, wherein an emitter is connected to the negative side of the second direct current power source, and a collector is connected to the other end of the drive coil;

a fourth transistor that is a PNP type transistor, wherein an emitter is connected between the first and second direct current power sources, and a collector is connected to a base of the third transistor;

a second base current controlling resistor adjusting a base current of the fourth transistor; and a second diode in which an anode is connected to the detecting coil and the cathode of the first diode, and a cathode is connected to a base of the fourth transistor, wherein the second diode controls and adjusts the base current of the fourth transistor such that the fourth transistor is turned on when a reverse voltage is applied by induced electromotive force generated in the detecting coil and such that the fourth transistor is turned off when a forward voltage is applied by the induced electromotive force of the detecting coil.

(Arrangement 5)

The brushless DC motor drive circuit of Arrangement 1 or 4, wherein each element constant is defined such that a drive current flows to the drive coil while no induced electromotive force is generated in the detecting coil.

(Arrangement 6)

The brushless DC motor drive circuit of Arrangement 5, wherein the drive current flows to the drive coil by differentiating resistance values between the first base current controlling resistor and the second base current controlling resistor or by differentiating power supply voltages between the first direct current power source and the second direct current power source.

(Arrangement 7)

An axial gap type brushless DC motor comprising:

the rotor;

the detecting coil and the drive coil, each comprised of an air-core coil;

a stator positioning the detecting coil and drive coil on substantially the same plane such that an effective coil face of each air-core coil and magnetic poles of a plurality of the permanent magnets in the rotor face each other with gaps therebetween; and the brushless DC motor drive circuit of any one of Arrangements 1 to 6.

(Arrangement 8)

A radial gap type brushless DC motor comprising:

a rotor, wherein the permanent magnets are positioned on its outer periphery such that N poles and S poles alternate;

a fixed yoke opposed to the permanent magnets of the rotor to form gaps therewith, wherein the fixed yoke is formed by winding the detecting coil and the drive coil around a plurality of convex cores formed on its inner periphery; and the brushless DC motor drive circuit of any one of Arrangements 1 to 6.

Effect of the Invention

The brushless DC motor drive circuit (and brushless DC motor) of the present invention may operate with low electric power without a hall element, etc.

Since it does not require a change (adjustment) of circuit configuration depending on an amount of load (size of inertia moment) etc., it may be used for various purposes.

DESCRIPTION OF EMBODIMENTS

Embodiments of the present invention are specifically described below with reference to the drawings. Each of the following embodiments is merely one aspect in embodying the present invention, and it is not intended to limit the present invention to the extent of the embodiments.

Embodiment 1

Figure 1:
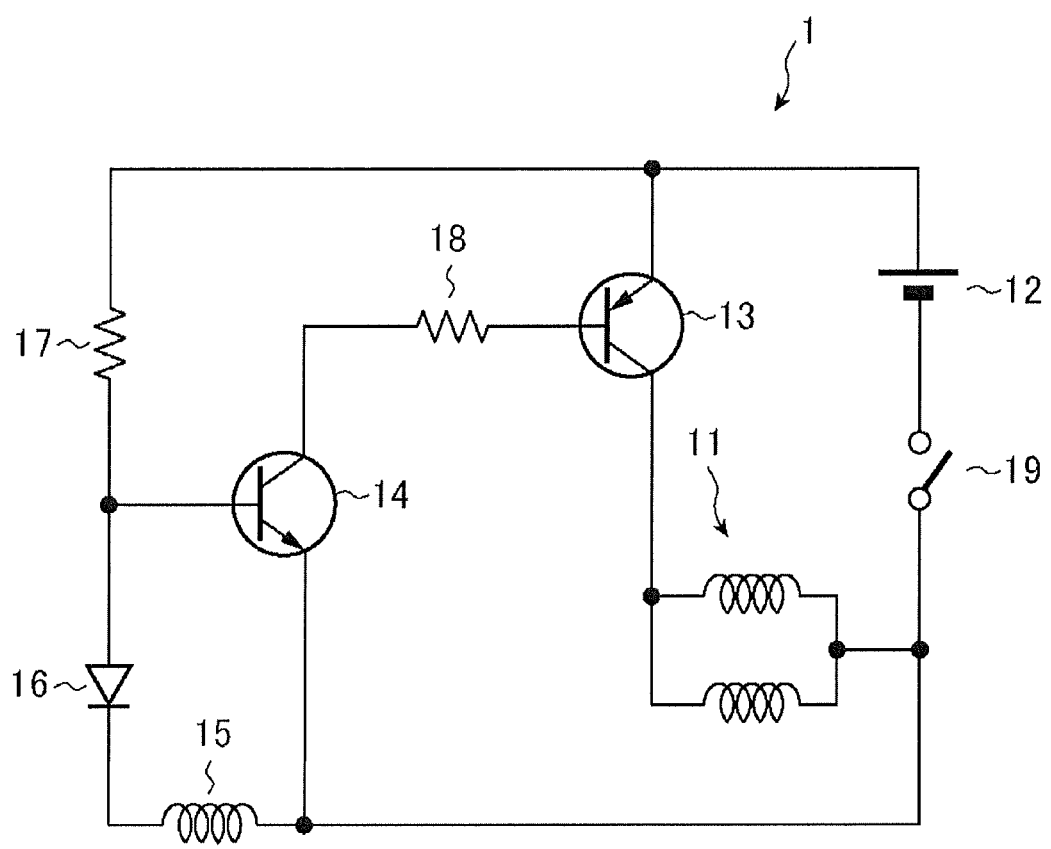
FIG. 1 is a circuit diagram showing a brushless DC motor drive circuit of Embodiment 1.

FIG. 1 is a circuit diagram showing a brushless DC motor drive circuit 1 of the present embodiment. The brushless DC motor drive circuit 1 of Embodiment 1 is a circuit for driving a brushless DC motor comprising a stator to which a detecting coil and drive coil are fixed, and a pivotally supported rotor comprising permanent magnets opposed to the stator.

As shown in FIG. 1, the brushless DC motor drive circuit 1 of Embodiment 1 comprises drive coils 11 positioned in a magnetic field of permanent magnets provided in the rotor; a direct current power source 12 supplying drive power to the drive coils 11; a transistor 13 (first transistor) that is emitter-grounded, wherein a collector is connected to the drive coils 11; a transistor 14 (second transistor) that is emitter-grounded, wherein a collector is connected to a base of the transistor 13; a resistor (base current controlling resistor) 17 adjusting a base current of the transistor 14; a detecting coil 15 positioned in the same magnetic field of the permanent magnets together with the drive coils 11, wherein the detecting coil 15 is provided between the base and an emitter of the transistor 14; and a diode 16 connected between the base and emitter of the transistor 14 in series with the detecting coil 15 and provided in a forward direction running parallel to the current between the base and emitter of the transistor 14, wherein the diode 16 adjusts a voltage between the base and emitter of the transistor 14 such that the transistor 14 is turned on when a reverse voltage is applied by induced electromotive force generated in the detecting coil 15 and such that the transistor 14 is turned off when a forward voltage is applied by the induced electromotive force of the detecting coil 15.

Here, "diode 16 connected in a forward direction running parallel to the current between the base and emitter of the transistor 14" means that the diode 16 connected in parallel between the base and emitter is provided in a forward direction with respect to a current direction parallel to a current direction (forward direction) between the base and emitter. In Embodiment 1, an anode of the diode 16 is connected to the base of the transistor 14, a cathode of the diode 16 is connected to one end of the detecting coil 15, and the other end of the detecting coil 15 is connected to the emitter of the transistor 14.

The brushless DC motor drive circuit 1 comprises a two-stage switching circuit comprised of the transistor 13 (PNP type) and transistor 14 (NPN type) in order to drive the drive coils 11 based on the induced electromotive force generated in the detecting coil 15. Further, the brushless DC motor drive circuit 1 comprises the diode 16 and resistor 17 in order to turn on and off the transistor 14 based on the small induced electromotive force generated in the detecting coil 15 (which are specifically described below).

The brushless DC motor drive circuit 1 of Embodiment 1 further has a current controlling resistor 18 connected between a base of the transistor 13 and a collector of the transistor 14; and a switch 19 provided between the direct current power source 12 and drive coils 11. The resistor 18 is for controlling a collector current of the transistor 14 (a base current of the transistor 13).

The diode 16 adjusts a voltage between the base and emitter of the transistor 14 such that the transistor 14 is turned on when the induced electromotive force generated in the detecting coil 15 applies a reverse voltage to the diode 16, and such that the transistor 14 is turned off when the induced electromotive force of the detecting coil 15 applies a forward voltage to the diode 16.

The "induced electromotive force generated in the detecting coil 15" is electromotive force generated by the permanent magnets in the rotor approaching or getting away from the detecting coil 15 in association with rotation of the rotor. That is, the detecting coil 15 detects a rotational state of the rotor (electromotive force depending on a rotational position or rotation speed is generated). The brushless DC motor drive circuit according to the present invention uses this induced electromotive force generated in the detecting coil for controlling energization to the drive coil.

In the brushless DC motor drive circuit 1, a mutual relationship among the direct current power source 12, resistor 17, and diode 16 is set such that a voltage $V_{BE}$ applied between the base and emitter of the transistor 14 while no induced electromotive force is generated in the detecting coil 15 is slightly greater than a threshold of the transistor 14 (such that the transistor is turned on).

The "threshold of the transistor" as used herein refers to a limit value of $V_{BE}$ by which the transistor may be regarded as being turned on. For example, assuming that the relationship between a base-emitter voltage and a collector current of a certain transistor is set such that when $V_{BE}$ is 0.5V, 80 μA of the collector current flows, and that this transistor is used as the transistor 14, if a transistor for which a current amplification factor is 200 is used as the transistor 13, the collector current of the transistor 13 is 16 mA, and thus, switching in a sufficiently saturated state is possible. On the other hand, if the collector current of the same transistor is 6 μA while $V_{BE}$ is 0.4V, the transistor 13 is turned off. That is, in this transistor, the "threshold of the transistor" as used herein is greater than 0.4V, and may be approximately 0.5V. However, the threshold of the transistor varies depending on an ambient temperature, and thus, a base voltage of transistor depending on the ambient temperature may be obtained by a forward voltage threshold of the diode.

Next, the operation of the brushless DC motor drive circuit 1 is described with reference to the drawings.

Figure 2:
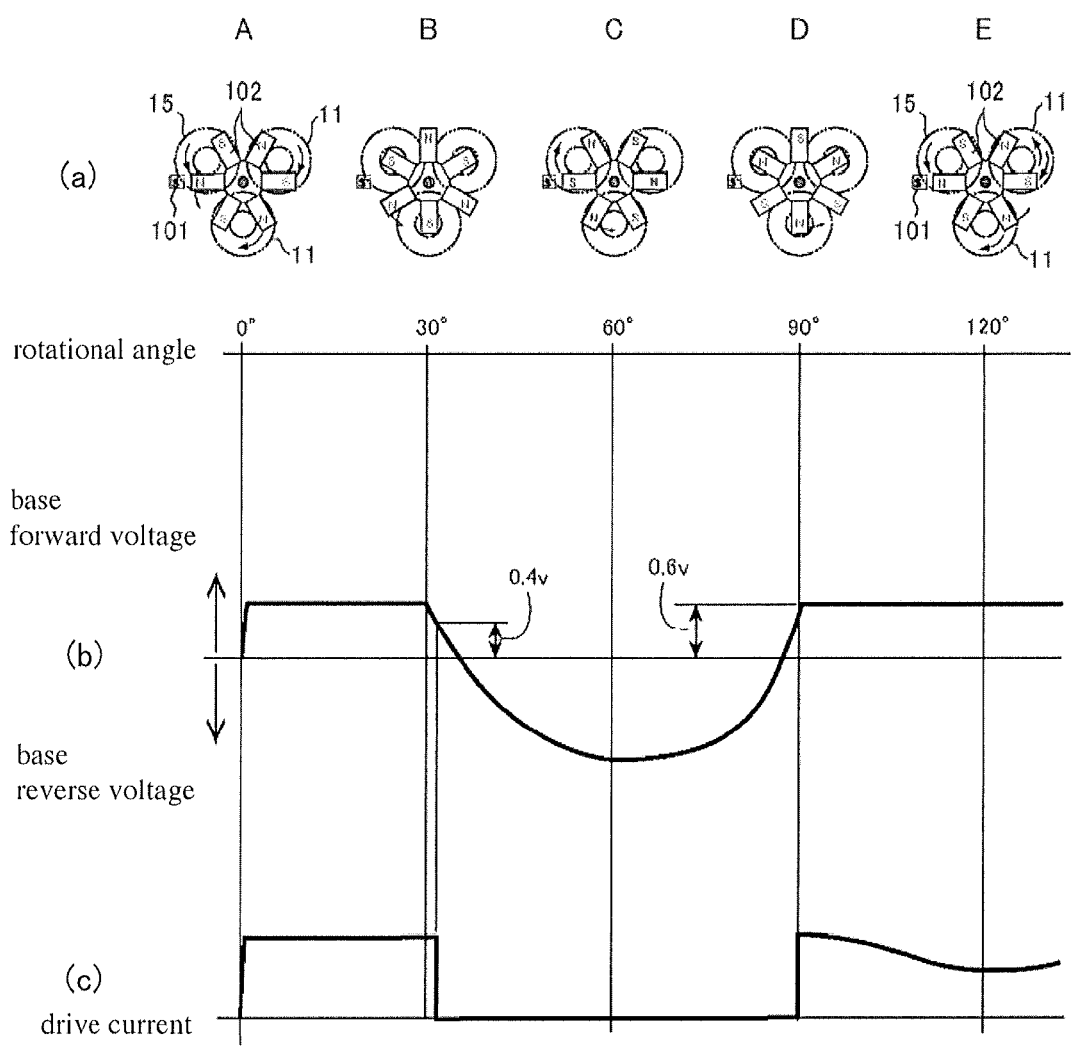
FIG. 2 is a diagram showing the relation among a drive current flowing to the drive coil provided in the brushless DC motor drive circuit of Embodiment 1, a base voltage of a transistor 14, and a rotor position.
Figure 3:
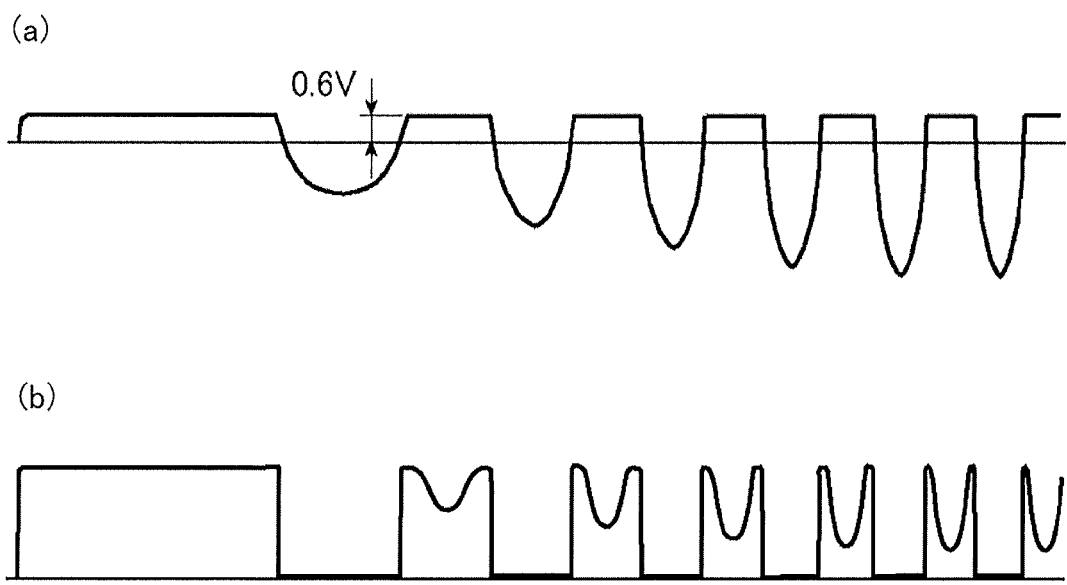
FIG. 3 is graphs showing a transition of the base voltage of the transistor 14 provided in the brushless DC motor drive circuit of Embodiment 1 (a), and a transition of the drive current flowing to a collector of a transistor 13 (b).

FIG. 2 is a diagram showing the relation among the base voltage of the transistor 14 (b), the drive current flowing to the drive coils 11 (c), and the rotor position (a). FIG. 3 is graphs showing a transition of the base voltage of the transistor 14 (a), and a transition of the drive current flowing to a collector of the transistor 13 (b).

In order to explain the operation, an axial type brushless DC motor comprising two drive coils 11 and one detecting coil 15 is used as an example ((a) in FIG. 2). The axial type brushless DC motor comprises a rotor, wherein the two drive coils 11 and one detecting coil 15 are placed at regular intervals in a circumferential direction on substantially the same plane as a plane vertical to a rotation axis of the rotor, and permanent magnets 102 facing to effective coil faces of the three coils to form small gaps therewith are positioned such that N poles and S poles alternate. Further, in order that a stop position while the rotor is stopped (State A in FIG. 2) may be set as a predetermined position, the motor comprises a small magnet 101 having a gap with respect to the permanent magnets 102 in the rotor. In this example, the positions of N magnetic poles of the permanent magnets 102 while the rotor is stopped are restrained by the small magnet 101 as an S magnetic pole with magnetic force weaker than magnetic force generated upon driving.

The "effective coil face of coil" refers to an extent of coil which may provide rotative force to the rotor by facing to the magnetic poles of the permanent magnets 102 while a current flows to the coil. That is, in FIG. 2, it corresponds to the portion of coil in a direction generally along a normal of a concentric circle of the rotation axis.

In the above axial type brushless DC motor, when a switch 19 in a stopped state is turned on, the direct current power source 12 (a dry cell battery of 1.6V, as a specific example) supplies 1.6V of power supply voltage to the circuit. In this state, no induced electromotive force is generated in the detecting coil 15, and the base current flows through the resistor 17 to the transistor 14 by power supply from the direct current power source 12. At this point, the voltage upon start-up shown by the voltage $V_{BE}$ between the base and emitter of the transistor 14 illustrated in the graph (b) of FIG. 2 and graph (a) of FIG. 3 is slightly higher than voltage drop in the diode (threshold voltage) due to a fine current flowing from the direct current power source 12 through the resistor 17 to the diode 16. In the present embodiment, the voltage between the base and emitter of the transistor 14 is adjusted so as to be slightly greater than the threshold of the transistor 14, for example, to be 0.6V (this is a specific example in which, assuming that the threshold of the transistor 14 is approximately 0.5V, the voltage between the base and emitter is set to be slightly (about 0.1V) greater than this threshold). That is, in relation to the direct current power source 12, a resistance value of the resistor 17 and the diode 16, a voltage slightly greater than the threshold is applied as $V_{BE}$ of the transistor 14.

By applying a voltage greater than the threshold of the transistor 14 as $V_{BE}$, the transistor 14 is turned on, and its collector current flows to the base of the transistor 13. Thus, a generally flat and linear drive coil current as shown in the graph (c) of FIG. 2 and graph (b) of FIG. 3 flows to the drive coils 11 by amplifying switching operation in a saturation region.

Then, according to Fleming's rules between a current flowing to each "effective coil face" of the drive coils 11 and lines of magnetic force of the permanent magnets 102 stationarily facing to the effective coil faces, electromagnetic force acts on the permanent magnets 102, such that they start to rotate from their stopped positions (e.g., the N magnetic poles of the permanent magnets start to move toward the adjacent drive coil 11). Then, the drive current is supplied to the drive coils 11 as shown in the lower graph in FIG. 2 until the N magnetic pole of the permanent magnet 102 facing to the small magnet 101 is in the position shown as State B in FIG. 2 in which no rotative force due to the electromagnetic force is generated (in this example, until the rotational angle of the rotor reaches 30 degrees), thereby surely accelerating the rotational movement of the permanent magnets 102.

After the rotation of the rotor is carried out such that it reaches State B in FIG. 2, the induced electromotive force that is a forward voltage with respect to the diode 16 (but a reverse voltage with respect to $V_{BE}$ of the transistor 14) starts to be generated in the detecting coil 15. Thus, only voltage drop of the diode forward voltage is subtracted by the diode 16 to pass the induced electromotive force, to adjust the base voltage $V_{BE}$ of the transistor 14 to be 0.4V or less, such that the transistor 14 is turned off. Thereafter, as shown in the graph (b) of FIG. 2 and graph (a) of FIG. 3, as for the voltage $V_{BE}$ of the transistor 14, a base reverse voltage shown by a downward arrow in the graph (b) of FIG. 2 (hanging-down curve) is generated. This causes the transistor 13 to also be turned off, and further, the drive current to the drive coils 11 to be stopped as shown in the graph (c) of FIG. 2 and graph (b) of FIG. 3. The base voltage (reverse voltage) of the transistor 14 due to the induced electromotive force of the detecting coil 15 is maximized in State C in FIG. 2, and the base current of the transistor 14 is stopped until State D, such that energization to the drive coils 11 is stopped.

Even if the drive coils 11 are not energized, the rotor is further rotated because of inertia, to reach State D in FIG. 2. At the instant of State D, no induced electromotive force is generated in the detecting coil 15. Thus, there is no function to turn off the transistor 14. And, at the same time, $V_{BE}$ of the transistor 14 shown in the graph (b) of FIG. 2 is 0.5V or more, as in the circuit operation upon start-up via the resistor 17, and a predetermined value of base current flows from the power source through the resistor 17 to the base of the transistor 14. This turns on the transistor 14, which causes the transistor 13 to also be turned on, and the drive coils 11 to be energized, thereby accelerating the rotation of the rotor. Beyond State D in FIG. 2, a reverse voltage from the voltage until then is generated in the detecting coil 15, as induced electromotive force in a direction of an upward arrow in the graph (b) of FIG. 2 (not shown because of a virtual value). In this case, since there is no reverse voltage preventing the base current of the transistor 14, the transistor 14 is maintained in on-state (0.6V of voltage which is slightly greater than the threshold of the transistor 14 is applied as $V_{BE}$, as shown in (b)). At this point, the reverse voltage is applied to the diode 16. In this case, the voltage of the detecting coil 18 is blocked by the diode 16 and does not affect the base voltage of the transistor 14. Therefore, as in the case in which no induced electromotive force is generated in the detecting coil 18 upon start-up, the base current flows from the power source through the resistor 17 to the transistor 14, the transistor 14 is maintained in on-state, and acceleration of rotation of the rotor is continued.

After that, as rotation of the rotor proceeds, positive and negative induced electromotive forces are alternately generated in the detecting coil 15. This allows for the above-described on-off control of each transistor so as to cause accelerated rotation of the rotor.

The graph (b) in FIG. 3 includes a curve of drive current hanging down from the saturation current value. This is because the drive current is reduced due to the reverse electromotive force generated in the drive coils 11, and it indicates that current decrease due to the reverse electromotive force becomes greater because of an increase in rotation speed of the rotor (thereby the power consumption as a motor may be kept low).

As above, the brushless DC motor drive circuit 1 of the present embodiment controls energization to the drive coils 11 by the induced electromotive force generated in the detecting coil 15 based on the rotational state of the rotor. Thus, appropriate switching based on the small induced electromotive force generated in the detecting coil 15 is necessary. The brushless DC motor drive circuit 1 according to the present invention achieves this by the above constitutions.

As is obvious from the above operational description, in order to operate even if the induced electromotive force of the detecting coil 15 is about ±0.1V, for example, the transistor 14 must be switched on and off depending on the small signal change of 0.1V. Further, in order to enhance the responsiveness, the transistor must be switched on and off depending on the smaller signal change. In such a case, an optimal element constant such as power source, resistor, diode, etc. should be set such that an electric potential slightly greater than the threshold of the transistor 14 (limit value by which the transistor may be regarded as on-state) is applied between the base and emitter of the transistor 14 while no induced electromotive force is generated in the detecting coil 15.

While in an input state equivalent to the time when no induced electromotive force is generated in the detecting coil 15 such as upon start-up, for example, when Position D shown in (a) of FIG. 2 is reached, if the reverse voltage to the base of the transistor 14 disappears, the transistor 14 may be switched on. That is, at the turning point (e.g., Position D above) where the induced electromotive force generated in the detecting coil 15 is changed from negative to positive (change from base reverse voltage to forward voltage in the transistor 14), the transistor 14 is switched on. Then, after the direction of the induced electromotive force generated in the detecting coil 15 is changed from positive to negative (e.g., Position B), $V_{BE}$ of the transistor 14 is 0.4V or less, such that the transistor 14 is switched off to stop the base current. This results in a drive circuit having high responsiveness with minimized power consumption. Incidentally, the specific value "slightly greater than" the threshold of the transistor may be appropriately determined based on a design concept of each product.

As above, the brushless DC motor drive circuit 1 of the present embodiment operates with low electric power without a hall element, etc., which may be, for example, a motor that rotates with slight electric power generated by photovoltaic power generation of an indoor solar cell. It may operate for a long time even if a dry cell battery, etc. with small capacity is used, which is cost efficient.

Since modification (adjustment) of the circuit configuration depending on an amount of load (size of inertia moment) is not required, it may be used for various purposes.

Even if induced electromotive force is generated in the detecting coil, no current flows to the detecting coil 15 owing to the diode 16 and the function of the transistor 14 for inhibiting the base reverse current, and thus, electromagnetic braking force acting on each permanent magnet is eliminated to improve efficiency.

Figure 4:
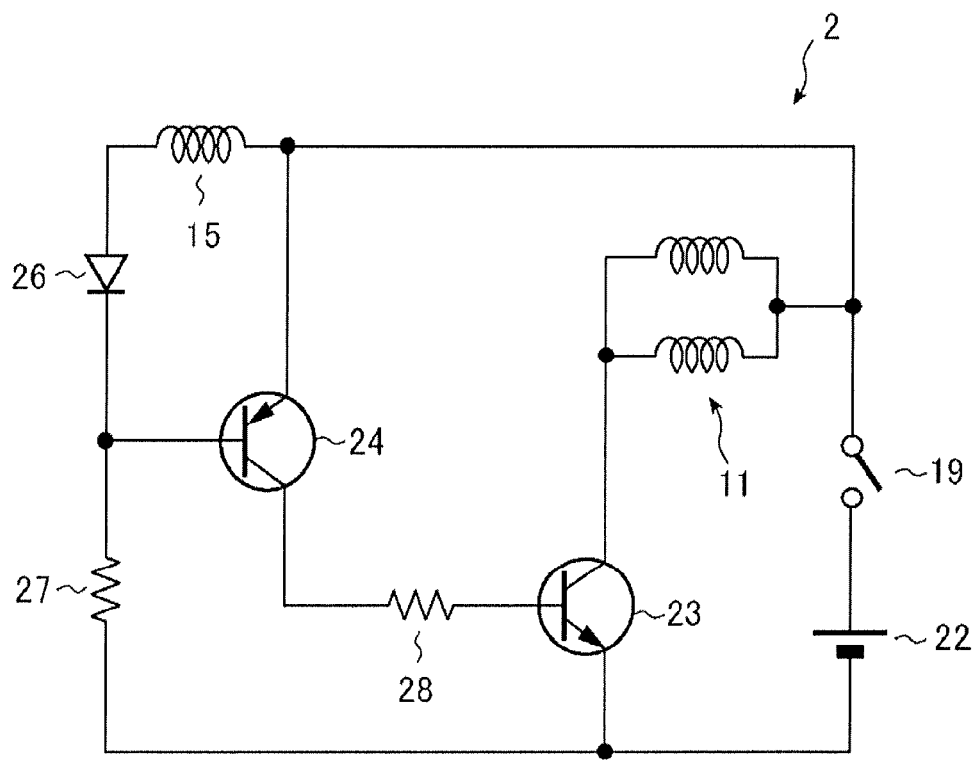
FIG. 4 is a circuit diagram showing another circuit configuration having a function similar to the brushless DC motor drive circuit of Embodiment 1.

In the illustrated brushless DC motor drive circuit 1 of Embodiment 1, the transistor 13 is PNP type, and the transistor 14 is NPN type. However, a constitution as shown in FIG. 4 is also acceptable, in which an NPN type emitter-grounded transistor 23 (first transistor) and a PNP type transistor 24 (second transistor) are provided; a cathode of a diode 26 is connected to a base of the transistor 24; an anode of the diode 26 is connected to one end of the detecting coil 15; and the other end of the detecting coil 15 is connected to an emitter of the transistor 24 (while positive and negative are reversed, the operational concept is similar to the above).

Embodiment 2

Figure 5:
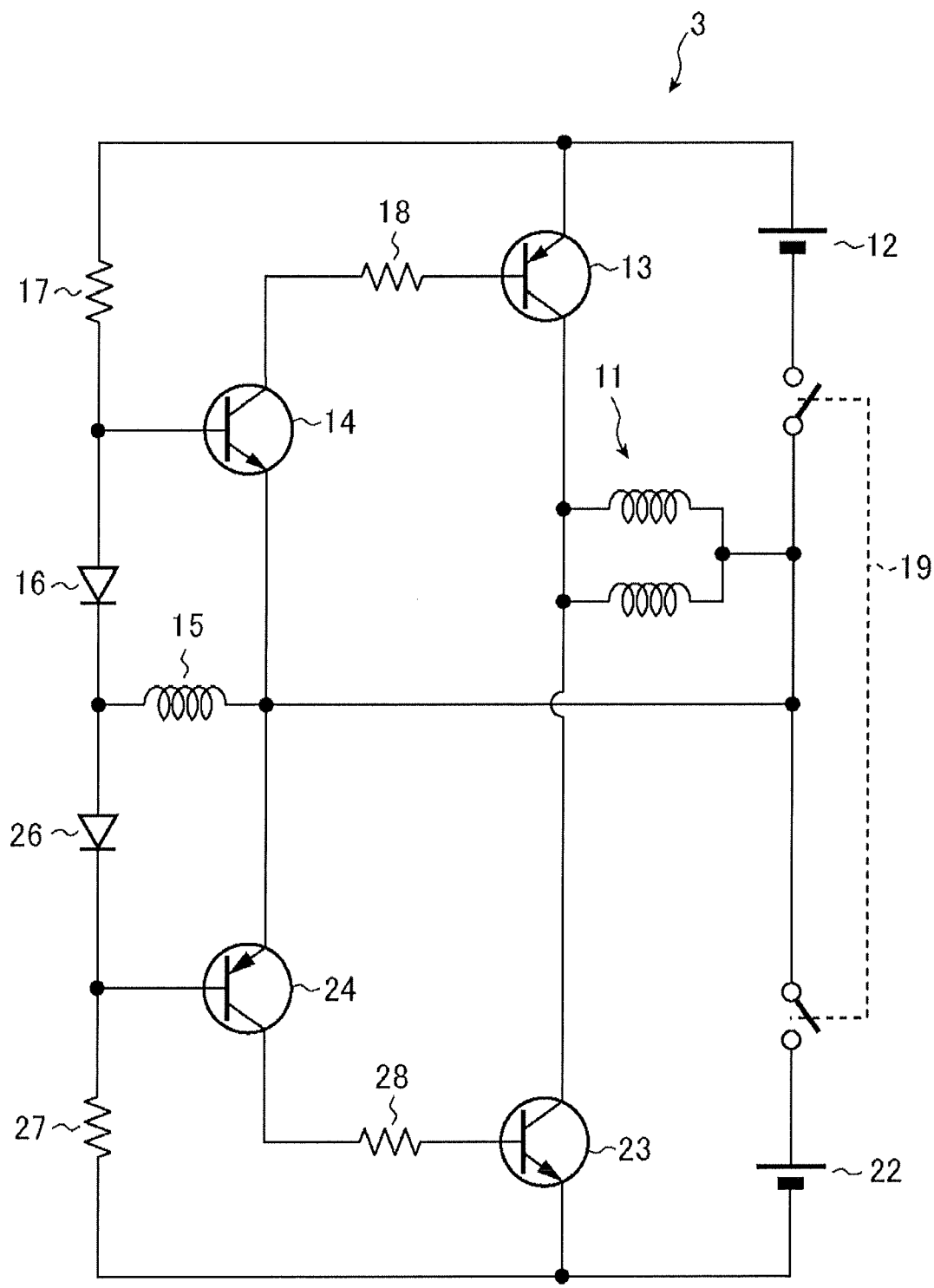
FIG. 5 is a circuit diagram showing a brushless DC motor drive circuit of Embodiment 2.

FIG. 5 is a circuit diagram showing a brushless DC motor drive circuit of Embodiment 2.

The brushless DC motor drive circuit 3 of Embodiment 2 is push-pull type in which the brushless DC motor drive circuit 1 (FIG. 1) and brushless DC motor drive circuit 2 (FIG. 4) of Embodiment 1 are combined. In FIG. 5, elements similar to FIG. 1 or 4 are designated by the same reference numerals, and explanation of such elements is omitted or simplified.

As shown in FIG. 5, collectors of a PNP type transistor 13 (first transistor) and an NPN type transistor 23 (third transistor) are connected, emitters of an NPN type transistor 14 (second transistor) and a PNP type transistor 24 (fourth transistor) are connected, and a cathode of the diode 16 and an anode of the diode 26 are connected, such that the circuits of FIGS. 1 and 5 are connected. This allows the drive coils 11 and detecting coil 15 to be shared.

The operational concept of the brushless DC motor drive circuit 3 of

Embodiment 2 is basically similar to that of Embodiment 1. In the circuit of FIG. 1 or 4 of Embodiment 1, driving force is provided to only the magnetic pole generated by unidirectional energization of the drive coils. However, in accordance with the brushless DC motor drive circuit 3 in FIG. 5, driving force is provided to magnetic poles generated by bidirectional energization of the drive coils (push-pull operation). Specifically, the operation is as follows.

Resistance values of the resistors 17, 27, and the diodes 16, 26 in the above arrangement are set so as to obtain $V_{BE}$ suitable for switching operation of the transistors 14, 24, as described in Embodiment 1. The upper circuit (corresponding to FIG. 1) and lower circuit (corresponding to FIG. 4) have a similar configuration with positive and negative being reversed. Thus, upon start-up when the switch 19 is turned on, an electric potential at a connection in serial connection with rectifying directions of two diodes 16, 26 aligned is the same as an electric potential at a junction connecting two direct current power sources 12, 22. Thus, no current flows between the connection and junction. That is, the upper circuit (corresponding to FIG. 1) and lower circuit (corresponding to FIG. 4) are balanced. Therefore, there is no energization to the drive coils 11, and the rotor is stopped.

If this state is changed to cause rotation of the rotor by some kind of mechanical starting or any electromagnetic start-up means, electromotive force is generated in the detecting coil 15. The direction of the electromotive force depends on the rotational direction upon the start-up. If the direction of the electromotive force in the detecting coil generated by the start-up rotation is the same as the base forward voltage of the transistor 14, the base reverse voltage is found in the transistor 24. Thus, while the transistor 14 (upper circuit) is on, the transistor 24 (lower circuit) is off, such that the drive current is supplied to the drive coils 11 based on the direct current power source 12 (upper circuit) (the rotor is driven in the initial rotational direction, e.g., by hand, to continue the rotation). On the other hand, as the rotation proceeds (or when the rotor is rotationally started in the opposite direction) to generate reverse electromotive force in the detecting coil 15, the transistor 14 (upper circuit) is off, and the transistor 24 (lower circuit) is on, such that the drive current (current in the opposite direction) is supplied to the drive coils 11 based on the direct current power source 22 (lower circuit).

Figure 6:
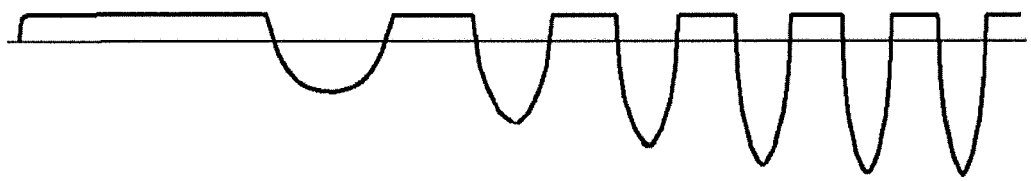
FIG. 6 is graphs showing a transition of a base voltage of a transistor 14 provided in the brushless DC motor drive circuit of Embodiment 2 (a), a transition of a base voltage of a transistor 24 (b), and a transition of a drive current flowing to drive coils 11 (c).
Figure 6:
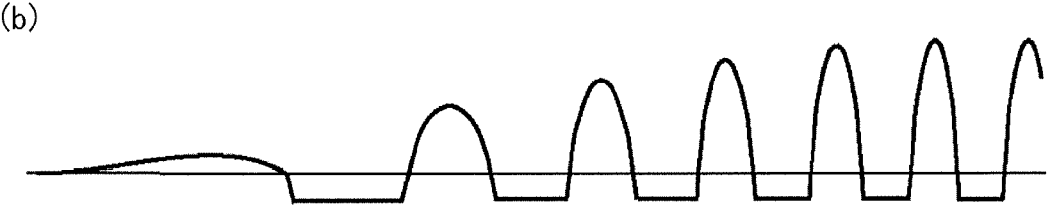
Figure 6:
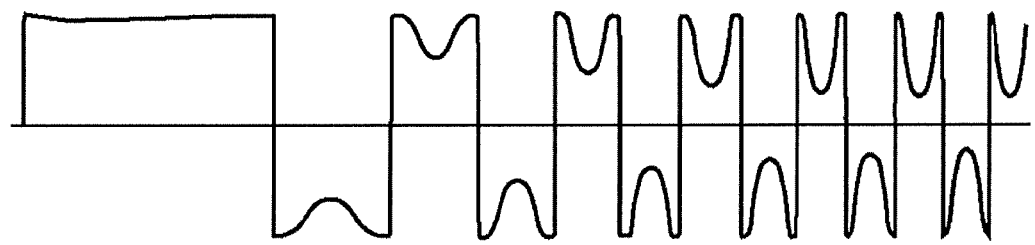

After that, as shown in FIG. 6, in tune with transitions of the base voltage of two transistors 14 and 24 (graphs (a), (b)) associated with change in electromotive force of the detecting coil 15, bidirectional switching energization to the drive coils 11 continuously occurs as illustrated in the graph (c). Then, electromagnetic force of the permanent magnet magnetic poles of the rotor and the magnetic poles of the drive coils 11 excited by the bidirectional energization accelerates and rotates the rotor.

Actually, it is often difficult to make the upper and lower circuits have a mechanically (and magnetically) identical configuration to achieve a state of balance. It is contemplated that upon the power-on, a unidirectional current flows to the drive coils 11, thereby rotating the rotor (after self-starting, the above operation occurs in association with the electromotive force generated in the detecting coil 15) (in this case, the start-up rotational direction is unknown). Aggressively utilizing the operation due to imbalance between the upper and lower circuits, each element constant may be defined (e.g., differentiating the resistance values between the resistors 17 and 27, differentiating the power supply voltages between the direct current power sources 12 and 22, etc.) so as to flow the drive current in a predetermined one direction to the drive coils while no induced electromotive force is generated in the detecting coil, thereby further ensuring the self-starting (in the intended rotational direction).

Figure 7A:
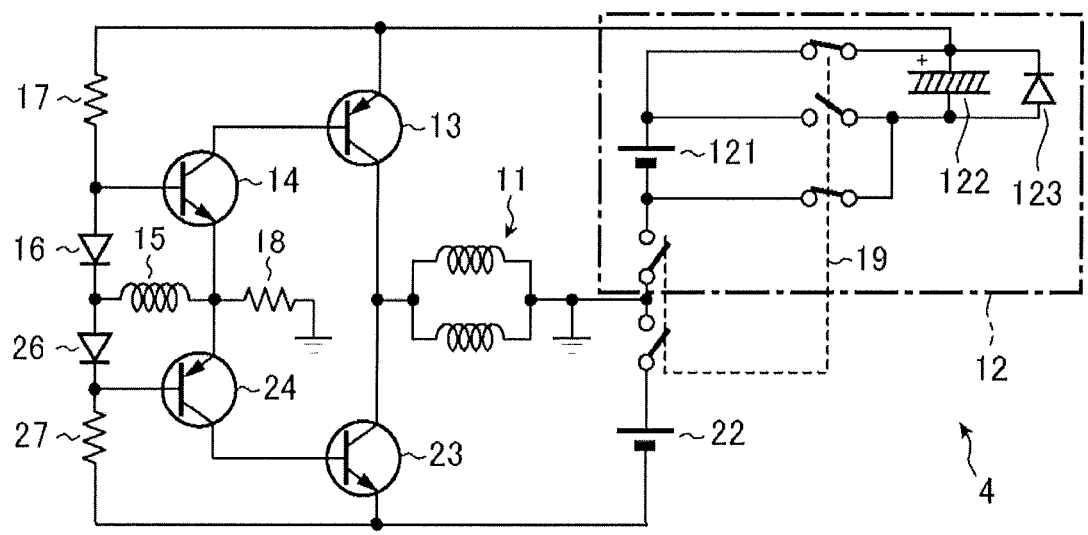
FIG. 7A is a circuit diagram showing a variation of the brushless DC motor drive circuit of Embodiment 2, wherein a direct current power source 12 is provided as a charge pumping circuit.
Figure 7B:
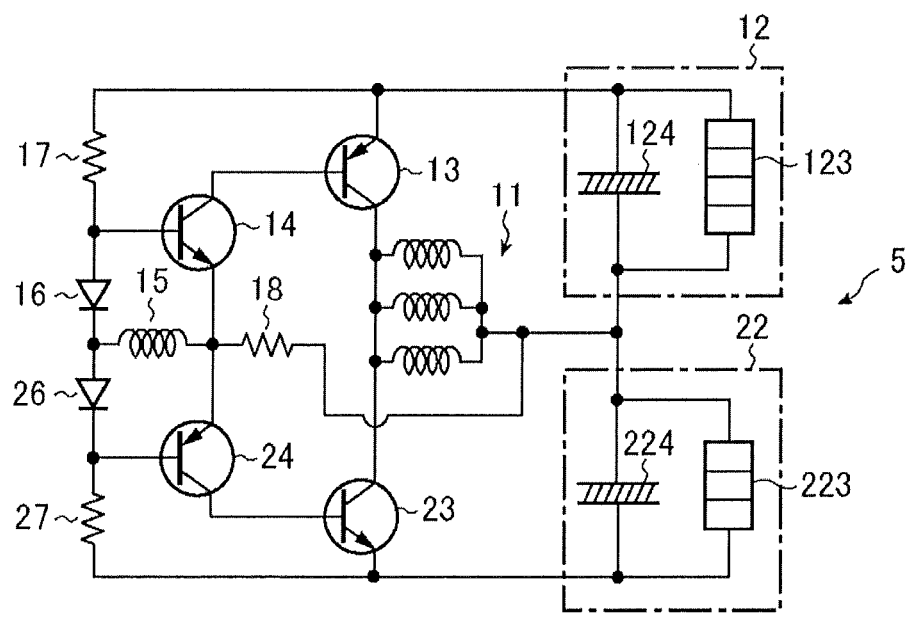
FIG. 7B is a circuit diagram showing another variation of the brushless DC motor drive circuit of Embodiment 2, wherein solar cells are used as direct current power sources.
Figure 7C:
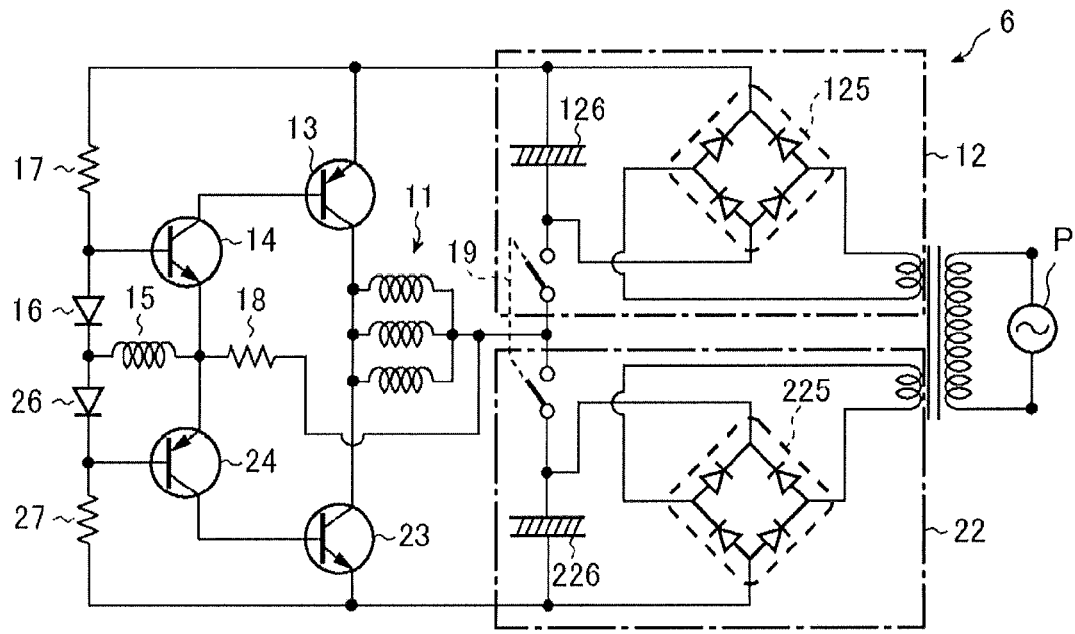
FIG. 7C is a circuit diagram showing a further variation of the brushless DC motor drive circuit of Embodiment 2, wherein direct current power sources are constituted by rectifying an alternating current.

Related examples of circuits are shown in FIGS. 7A-7C. The same reference numerals are used for elements similar to FIG. 5.

In FIG. 7A, a charge pumping circuit comprised of a capacitor 122 and diode 123 is added to the direct current power source 12 in the upper circuit. This causes the power supply voltage of the upper circuit to be boosted upon the power-on of the interlock switch 19, and the upper circuit to be turned on upon the start-up. By connecting the current controlling resistor 18 to an emitter connection point for the transistors 14 and 24 and between the direct current power sources 12 and 22 (reference potential), it is shared.

In FIG. 7B, the direct current power sources 12, 22 are comprised of solar cells 123, 223 and capacitors 124, 224, respectively, and voltage of the solar cell 123 in the upper circuit is higher than that of the solar cell 223 in the lower circuit. While the example of FIG. 7B does not comprise a power switch, the motor may stop during night, and then, self-start upon receiving light when a room is brightened up.

The "direct current power source" may be formed by rectifying an alternating-current power source as shown in FIG. 7C. In this form, self-starting in the intended rotational direction may be performed by, for example, making a difference in the amount of windings on secondary coils powered from an alternating-current power source P in the upper and lower circuits.

Figure 8:
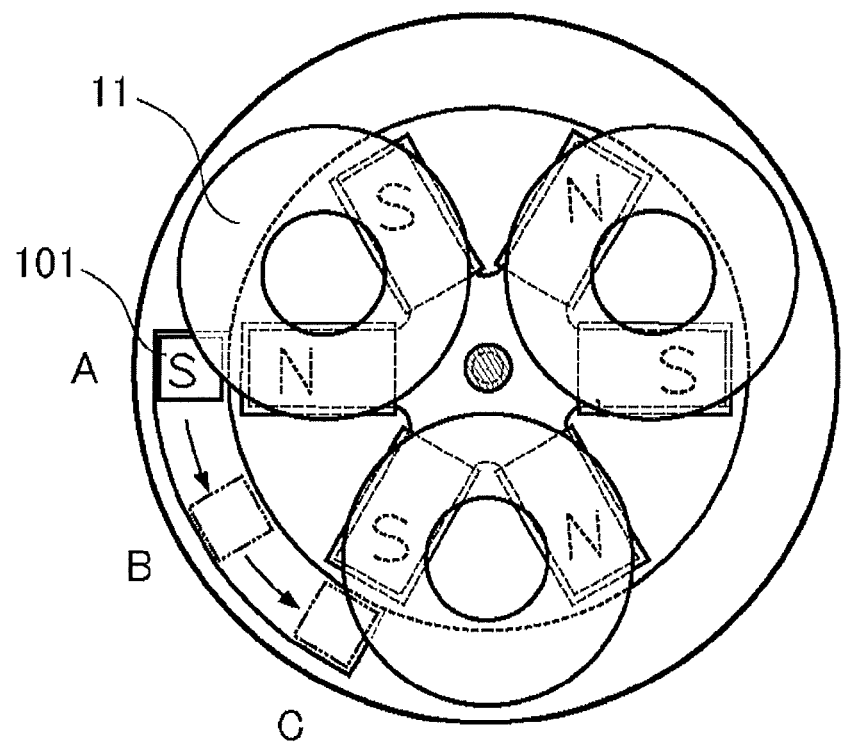
FIG. 8 is a diagram illustrating a position of a small magnet regulating a stop position of the rotor.

For example, when no power switch is provided as shown in FIG. 7B, a stop position of the stator may be manipulated to prevent automatic self-starting. FIG. 8 shows a constitution in which a position of the small magnet 101 may be changed thereby enabling selection of the start-up rotational direction and stopping of self-starting. As understood from this figure and the above description, while positioning the small magnet 101 at Position A or C in FIG. 8 allows for self-starting (the rotational directions in Positions A and C are opposite), the self-starting may be prevented in Position B.

Embodiment 3

Figure 9:
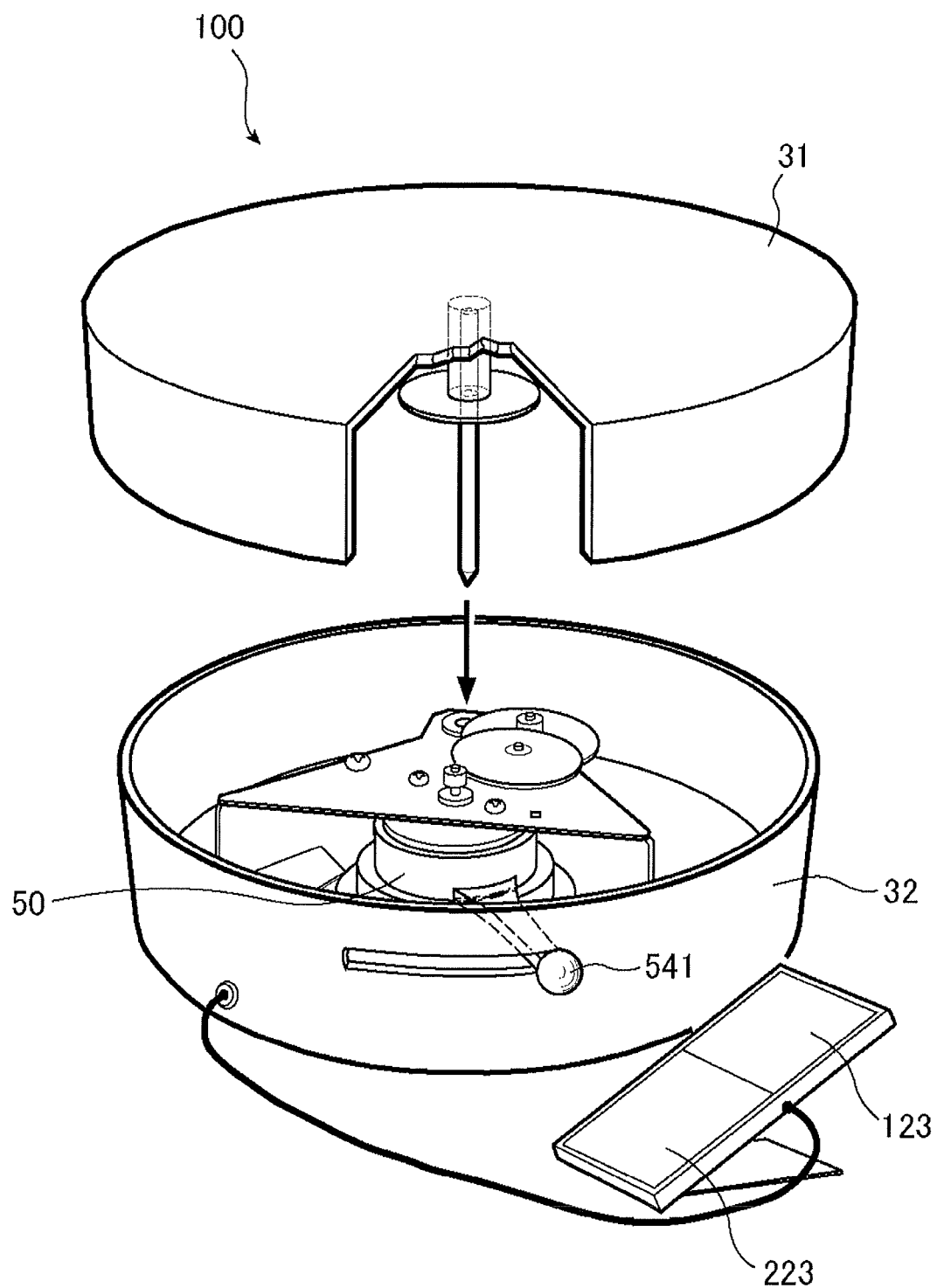
FIG. 9 is a partially exploded perspective view showing a turntable of Embodiment 3.

FIG. 9 is a partially exploded perspective view showing a turntable of Embodiment 3. The turntable 100 comprises an axial gap type brushless DC motor 50 driven by the drive circuit of FIG. 7B. When solar cells 123, 223 are illuminated with light, a table 31 rotates. For example, it is for rotationally displaying goods on the table 31 for the purpose of a point-of-sale advertisement. A housing 32 comprises the axial gap type brushless DC motor 50, and stores therein components, such as connecting wires to the solar cells 123, 223, a power transmission mechanism having an appropriate gear ratio, or a rotary shaft and its bearing for the table 31.

Figure 10A:
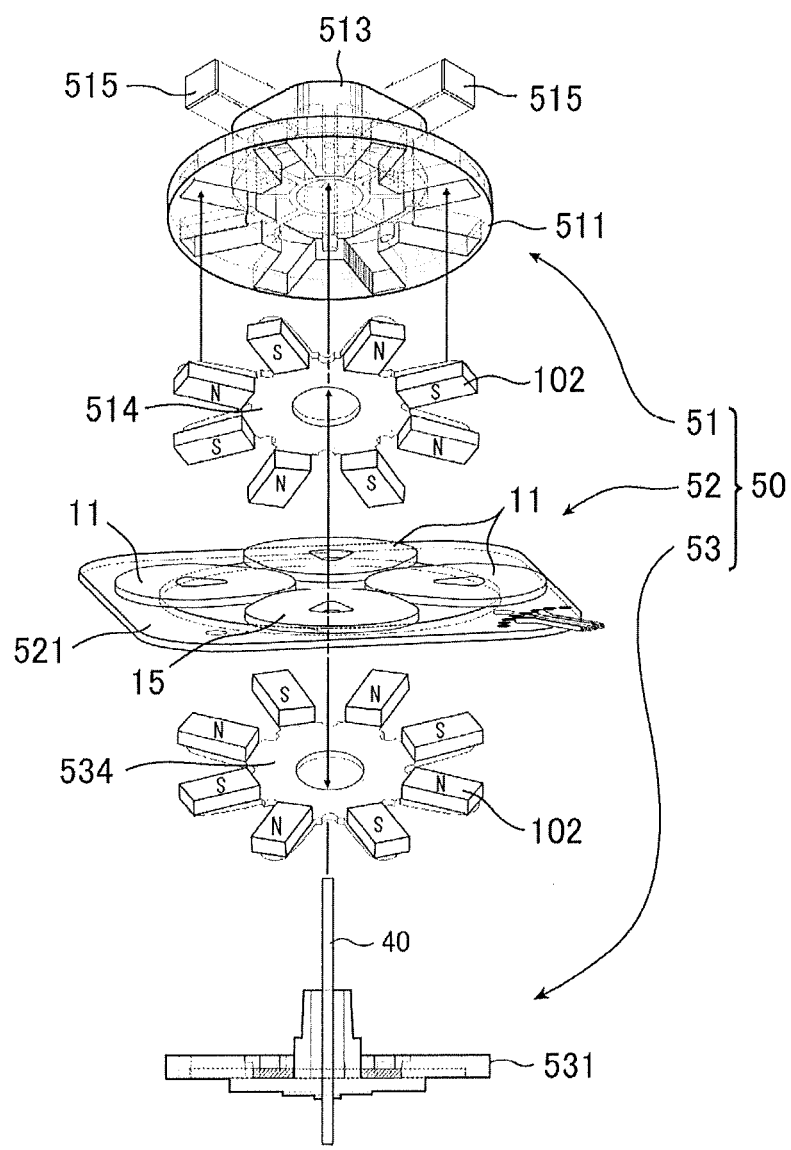
FIG. 10A is an exploded perspective view showing an axial gap type brushless DC motor provided in the turntable of Embodiment 3.
Figure 10B:
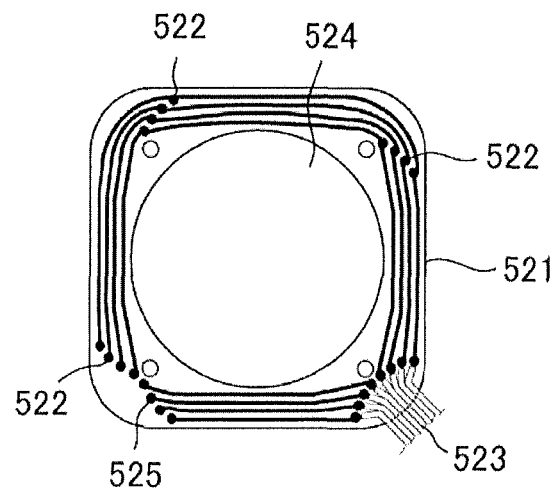
FIG. 10B is a diagram showing a printed circuit board provided in a stator block.
Figure 11A:
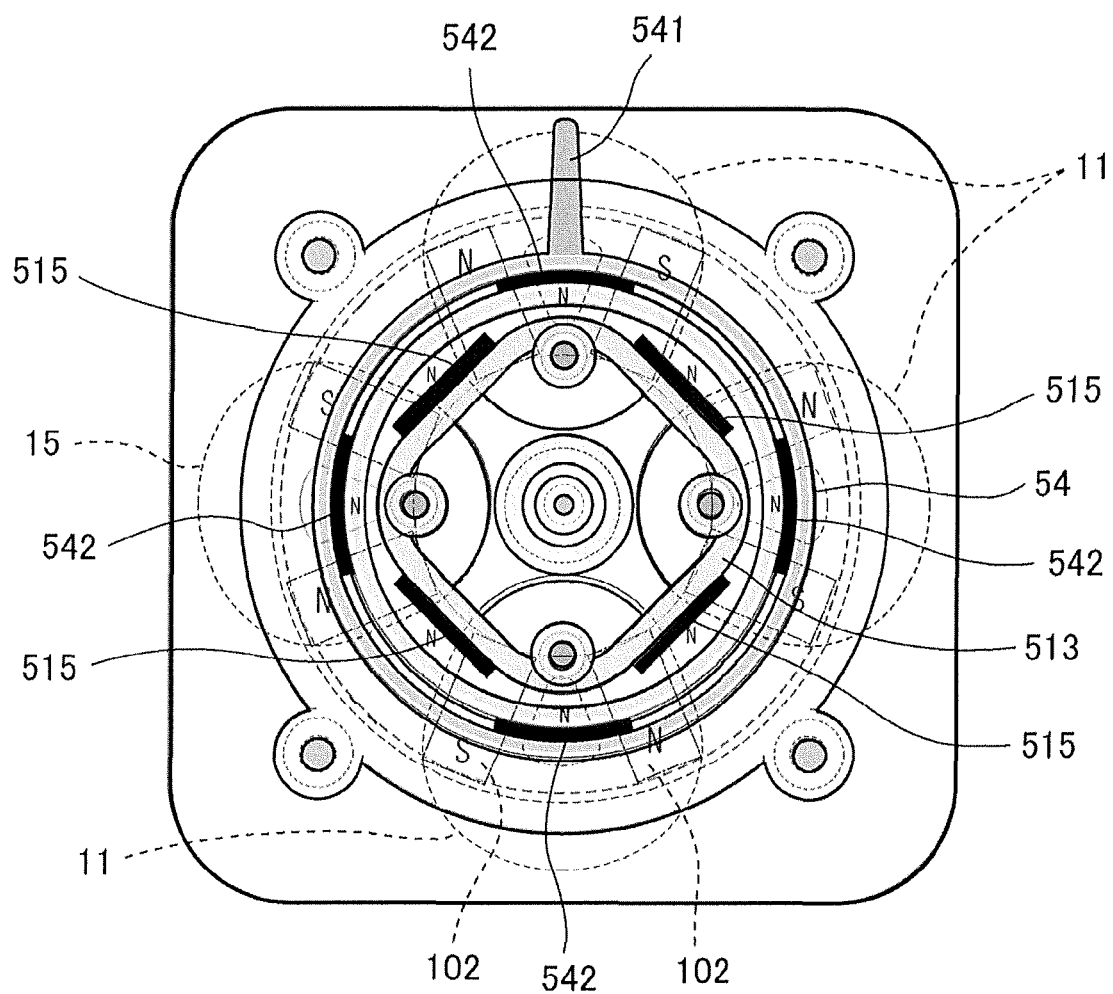
FIG. 11A is a top view of the axial gap type brushless DC motor provided in the turntable of Embodiment 3.
Figure 11B:
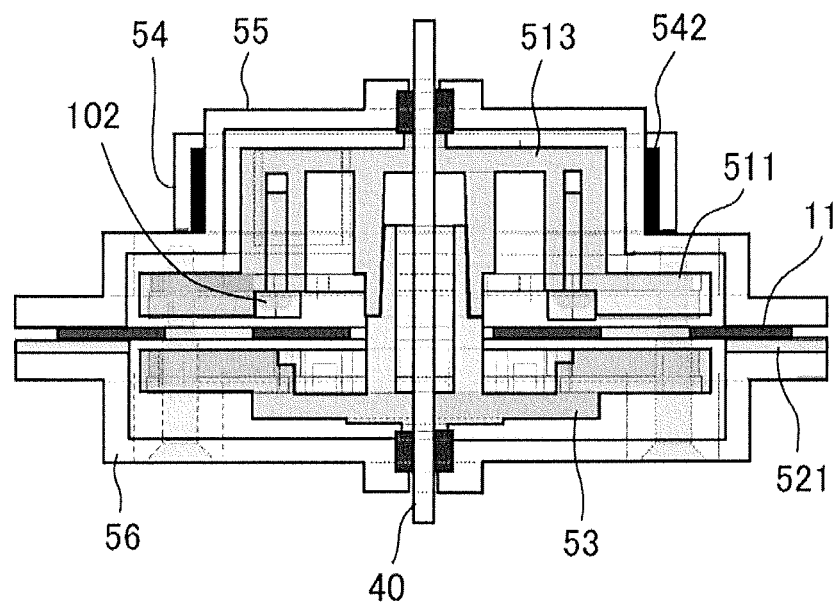
FIG. 11B is a vertical cross-sectional view of the axial gap type brushless DC motor provided in the turntable of Embodiment 3.

Each of FIGS. 10A, 10B, 11A, and 11B shows the axial gap type brushless DC motor 50 (hereinafter referred to as "motor 50"). In particular, FIG. 10A is an exploded perspective view showing the motor 50, FIG. 11A is its top view, and FIG. 11B is its vertical sectional view.

As shown in FIG. 10A, the motor 50 is generally comprised of three blocks: an upper rotor block 51, a stator block 52, and a lower rotor block 53.

The stator block 52 is comprised of a printed circuit board 521 for electrically connecting each coil (detecting coil 15 and drive coils 11).

The detecting coil 15 and drive coils 11 are comprised of air-core coils. The present embodiment has three drive coils. As shown in FIG. 10A, the detecting coil 15 and three drive coils 11 are positioned at regular intervals on substantially the same plane in the printed circuit board 521.

As shown in FIG. 10B, the printed circuit board 521 has a hole 524 formed such that the permanent magnets of the rotor do not touch its center portion. The detecting coil 15 is soldered to a detecting coil connecting terminal 525 of the printed circuit board 521, and the drive coils 11 are soldered to respective drive coil connecting terminals 522, such that they are electrically connected to the drive circuit by leading lines 523.

The upper rotor block 51 is formed by unitarily shaping a disk 511 made from polycarbonate and a hollow quadrangular prism 513 provided on its upper surface, and fitting eight rare earth magnets 102 fixed to a yoke 514 into recesses formed on a lower surface of the disk 511. Gum magnets 515 with N magnetic poles on their outside are affixed to each of four side surfaces of the quadrangular prism 513.

The lower rotor block 53 is also made from polycarbonate, and comprises a shaft support supporting a shaft 40, and a fitting part for mating with the upper rotor block 51. It is formed by fitting eight rare earth magnets 102 fixed to a lower yoke 534 into recesses formed on an upper surface of a disk 531.

The basic configuration of the motor 50 of the present embodiment is fabricated by assembling the above blocks and integrating them while aligning respective center parts. In the fabricated state, upper and lower rare earth magnets 102 are respectively positioned so as to face to the effective coil faces of air-core coils placed at regular intervals on substantially the same plane to have small gaps therewith.

The integrated blocks are housed in and assembled to housings for containing them (upper housing 55 and lower housing 56).

A cylindrical portion is formed in the portion of the upper housing 55 for containing the quadrangular prism 513, and a changeover switch mechanism 54 is attached to an outer periphery of the cylindrical portion, thereby constituting the motor 50.

The changeover switch mechanism 54 is pivotally attached to the outer periphery of the cylindrical portion of the upper housing 55, and as shown in FIGS. 11A and 11B, four N-pole small magnets 542 for repelling the gum magnets 515 provided on the side surfaces of the quadrangular prism 513 are equidistantly provided. Like the small magnet 101 in Embodiment 1, these are for restraining the stop position of the rotor to a desired position. However, the present embodiment differs from Embodiment 1 in that the present embodiment utilizes magnetic force with magnets provided separately from the permanent magnets 102 (gum magnets 515 on the side surfaces of the quadrangular prism 513).

FIGS. 12A-12D are diagrams illustrating the changeover switch mechanism 54. Regarding FIGS. 12A-12D, when a lever 541 is in the position shown in FIG. 12A, each rare earth magnet 102 is regulated to stop at the position where it faces to each effective coil face of the drive coils 11, and thus, rotational start-up in the predetermined direction occurs when power is supplied.

Figure 12A:
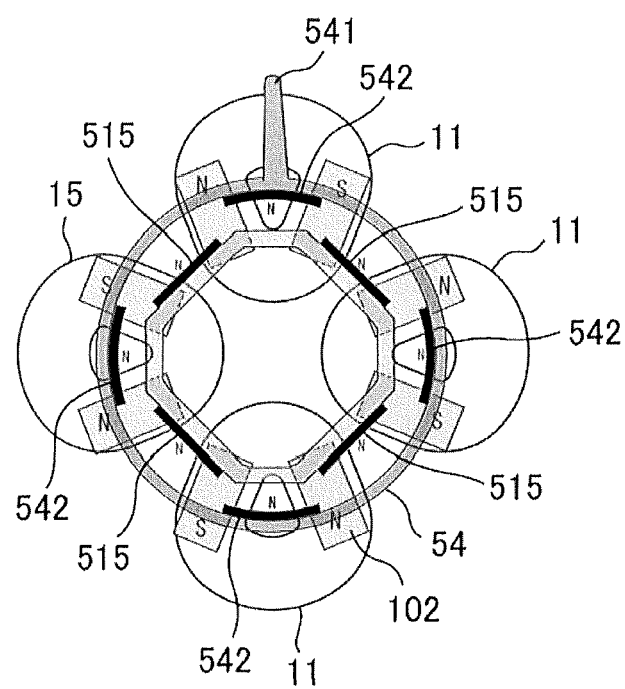
FIG. 12A is a diagram illustrating a changeover switch mechanism of Embodiment 3 (a position of a small magnet regulating a stop position of the rotor).
Figure 12B:
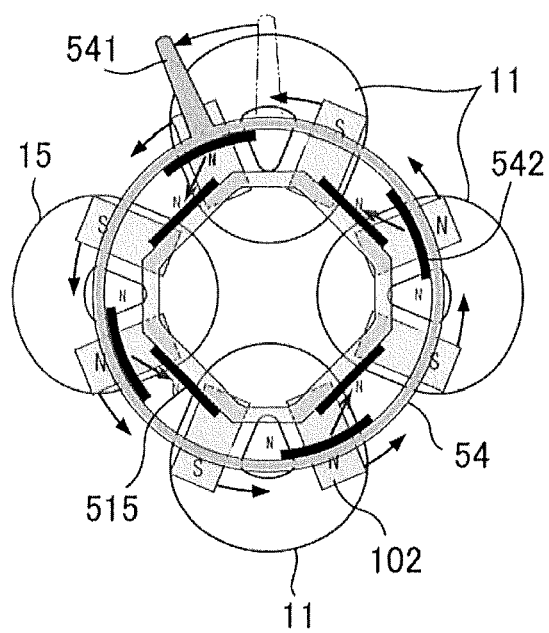
FIG. 12B is another diagram illustrating the changeover switch mechanism of Embodiment 3 (a position of the small magnet regulating the stop position of the rotor).
Figure 12C:
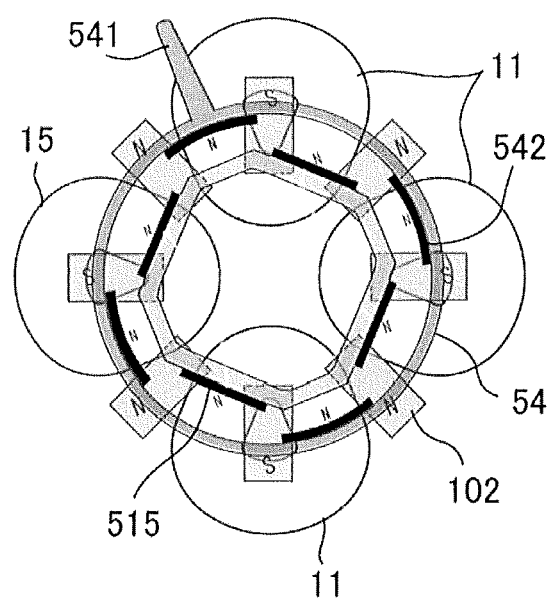
FIG. 12C is a further diagram illustrating the changeover switch mechanism of Embodiment 3 (a position of the small magnet regulating the stop position of the rotor).

While in the stopped state shown in FIG. 12A, if the lever 541 is manipulated to reach the position shown in FIG. 12B, repellent force between each gum magnet 515 and each small magnet 542 causes the rotor to be in the state shown in FIG. 12C. In this position, since each rare earth magnet 102 is regulated not to face to each effective coil face, self-starting will not occur even if power is supplied.

Figure 12D:
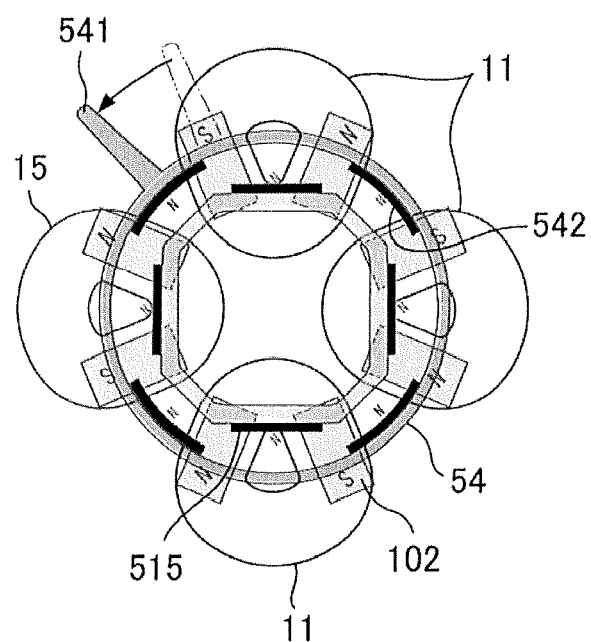
FIG. 12D is a still further diagram illustrating the changeover switch mechanism of Embodiment 3 (a position of the small magnet regulating the stop position of the rotor).

When the lever 541 is further manipulated to reach the position shown in FIG. 12D, the arrangement of magnetic poles is opposite relative to FIG. 12A. Thus, when power is supplied, the direction of rotational start-up is opposite relative to FIG. 12A.

As described above, the motor 50 of the present embodiment is largely comprised of three blocks which are assembled to be integrated. Thus, operation efficiency may be improved, and manufacturing and component management are easy. The turntable is described herein as an example. However, since the motor 50 of the present embodiment is high-efficiency, and may be used with low electric power, it may be used for various purposes, such as a personal electric table fan or fragrance emitting device having a compact solar cell (or dry cell battery with small capacity) as a power source.

Figure 13:
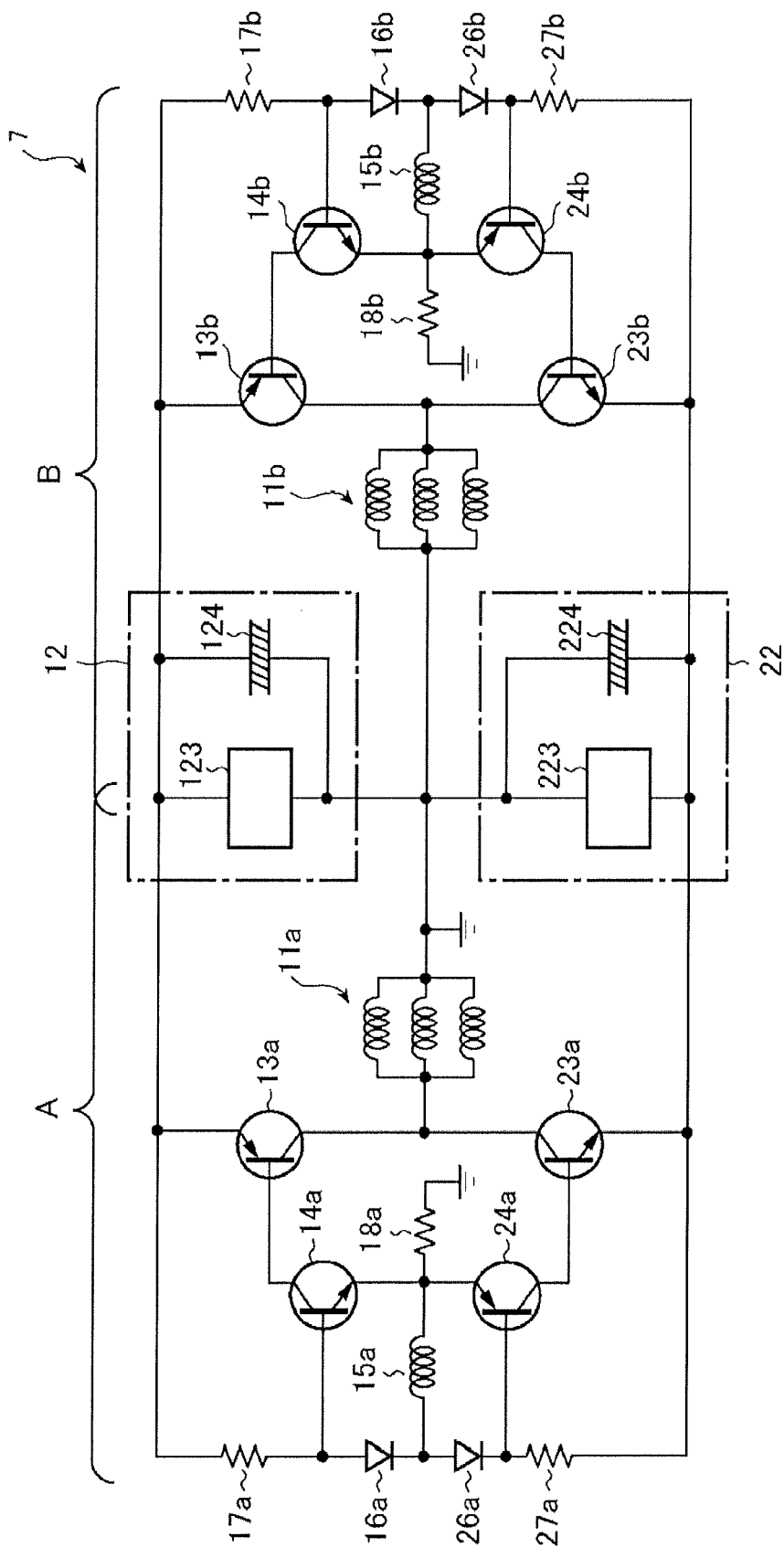
FIG. 13 is a circuit diagram showing a dual-phase drive brushless DC motor drive circuit.

While the single-phase circuit is described using examples, multi-phase driven type is also acceptable, as one example of which is shown in FIG. 13. FIG. 13 is a circuit diagram showing a dual-phase drive brushless DC motor drive circuit, in which the same reference numerals are used for components similar to FIG. 7B. As shown in FIG. 13, each of Phases A and B has a circuit configuration similar to FIG. 7B, and the direct current power sources 12 and 22 are shared.

When this is applied to the axial gap type brushless DC motor of the present embodiment, another printed circuit board with each coil attached, similar to the printed circuit board 521 (offset by 22.5° relative to coils of Phase A) is prepared for Phase B, with reference to FIG. 10A. Then, the printed circuit board with each coil attached for Phase A and the printed circuit board with each coil attached for Phase B are sandwiched between the upper housing 55 and lower housing 56 such that respective coils of Phases A and B are in close contact with each other and overlapped (of course, coils of Phases A and B are not electrically connected). Further, upper and lower eight rare earth magnets fixed to the yokes are positioned on the upper rotor block 51 and the lower rotor block 53 respectively, so as to face to the effective coil faces of overlapping offset coils for Phases A and B.

This enables powerful and stable driving via dual-phase drive. Further, since magnetic flux density through each coil is raised, electromagnetic driving force may be increased. Also, eddy-current loss or iron loss due to a stator yoke may be eliminated, and loss by friction due to excessive loading on a bearing is eliminated, thereby providing a low-power highly-efficient motor.

Figure 14:
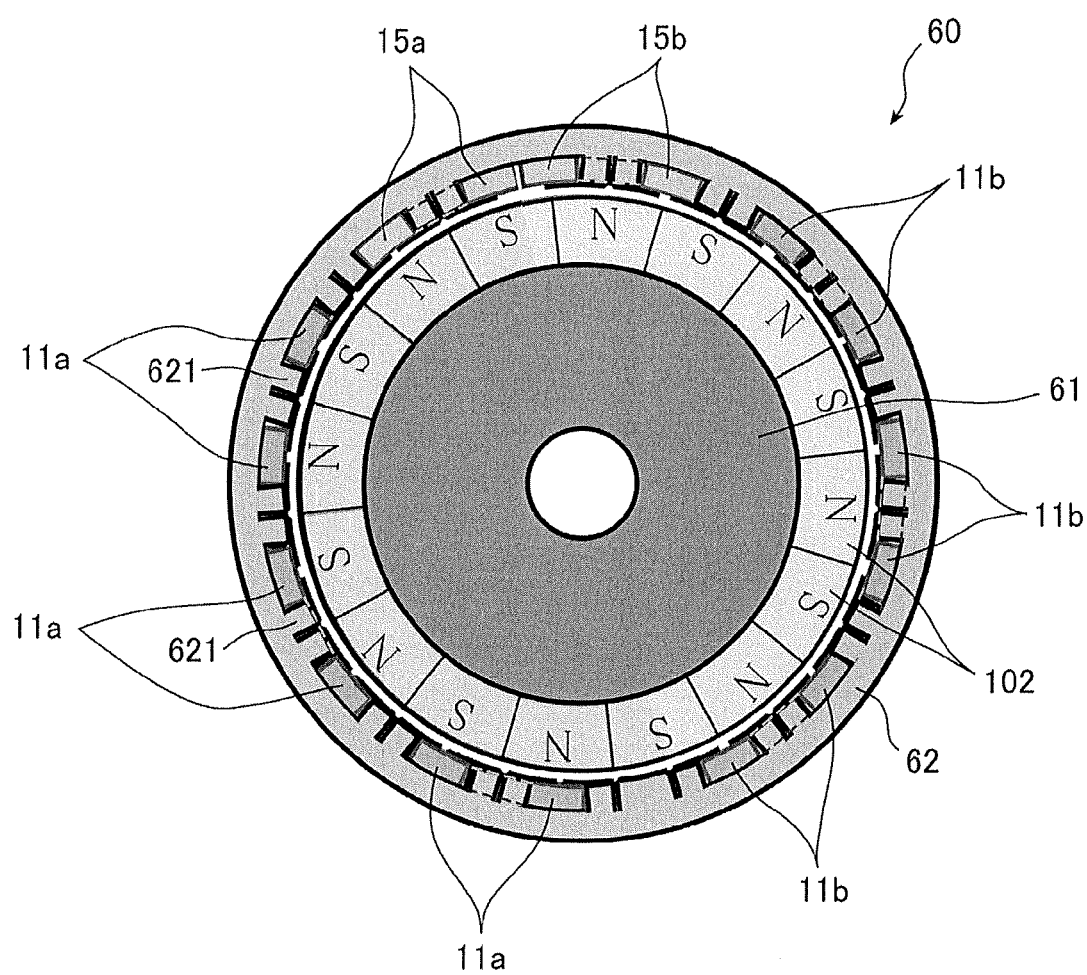
FIG. 14 is a diagram showing a radial type dual-phase drive brushless DC motor.
Figure 15A:
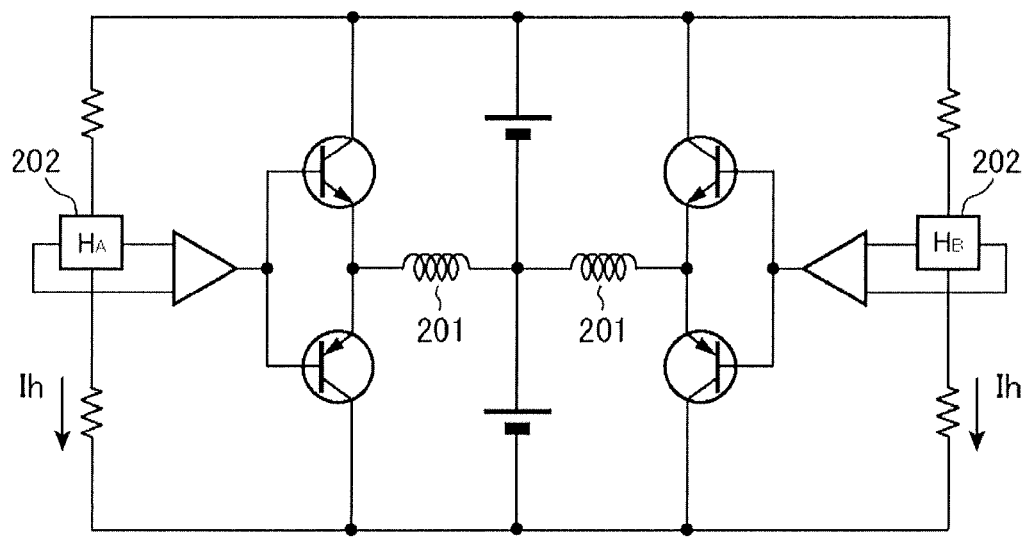
FIG. 15A is a circuit diagram shown in Non-patent document 1.
Figure 15B:
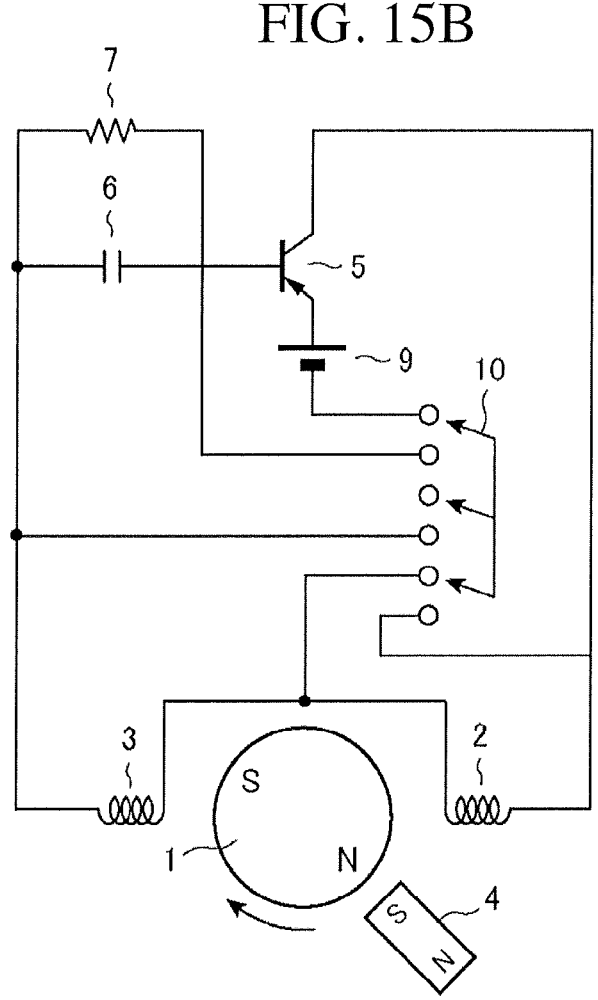
FIG. 15B is a circuit diagram shown in Patent document 1.

While the axial gap type is described using examples herein, the drive circuit of the brushless DC motor according to the present invention may be applicable to a radial type motor. FIG. 14 shows one example of a radial type brushless DC motor utilizing the drive circuit of the brushless DC motor according to the present invention.

FIG. 14 is a cross-sectional view in a plane vertical to the rotation axis of the radial gap type brushless DC motor 60 (hereinafter referred to as a radial type motor 60). As shown in FIG. 14, the radial type motor 60 comprises a rotor 61 having permanent magnets 102 on its outer periphery with their N and S poles alternating, and a fixed yoke 62 facing to the rotor 61 to form a small gap therewith.

A plurality of convex cores 621 are formed on an inner periphery of the fixed yoke 62. The detecting coils 15 and drive coils 11 are wound around the cores 621. The interval between the cores 621 is defined such that effective coil faces of respective coils provided thereon face to the permanent magnets 102.

The example of FIG. 14 shows a dual-phase radial type motor driven by the drive circuit of FIG. 13, for example, in which the left side is Phase A and the right side is Phase B. While effective coil faces of respective coils of Phase A (one detecting coil 15a and a plurality of drive coils 11a) face to the permanent magnets 102 (i.e., in the condition for obtaining the maximum rotative force), effective coil faces of respective coils (one detecting coil 15b and a plurality of drive coils 11b) face to boundaries of permanent magnets in Phase B (rotative force is minimum).

According to the radial type motor 60 in FIG. 14, the driving force is significantly increased compared to the motor using air-core coils, and it may be applied to rotatable devices requiring significant power, such as a signboard rotating by an outdoor solar cell.

EXPLANATIONS OF NUMERALS 1, 3, 4, 5, 6, 7: brushless DC motor drive circuit
11: drive coil
12: direct current power source
13: transistor (first transistor)

14: transistor (second transistor)
15: detecting coil
16: diode
17: resistor (base current controlling resistor)
22: direct current power source (second direct current power source)
23: transistor (third transistor)
24: transistor (fourth transistor)
26: diode (second diode)
27: resistor (second base current controlling resistor)
50: axial gap type brushless DC motor
51: upper rotor block (rotor)
52: stator block (stator)
53: lower rotor block (rotor)
60: radial gap type brushless DC motor
61: rotor
62: fixed yoke (stator)
100: turntable
101: small magnet
102: permanent magnet

The invention claimed is:

1. A brushless DC motor drive circuit comprising:
a drive coil positioned in a magnetic field of permanent magnets provided in a rotor;
a direct current power source supplying drive power to the drive coil;
a first transistor that is emitter-grounded, in which a collector is connected to the drive coil;
a second transistor that is emitter-grounded, in which a collector is connected to a base of the first transistor;
a base current controlling resistor adjusting a base current of the second transistor;
a detecting coil positioned in a magnetic field of the permanent magnets and provided between a base and an emitter of the second transistor; and
a diode connected between the base and emitter of the second transistor in series with the detecting coil and provided in a forward direction running parallel to a current between the base and emitter of the second transistor, wherein the diode controls and adjusts the base current of the second transistor such that the second transistor is turned on when a reverse voltage is applied by induced electromotive force generated in the detecting coil and such that the second transistor is turned off when a forward voltage is applied by the induced electromotive force of the detecting coil.

2. A brushless DC motor drive circuit comprising:
a first direct current power source and a second direct current power source connected in series;
a drive coil positioned in a magnetic field of permanent magnets provided in a rotor, wherein one end of the drive coil is connected between the first and second direct current power sources;
a first transistor that is a PNP type transistor, wherein an emitter is connected to the positive side of the first direct current power source, and a collector is connected to the other end of the drive coil;
a second transistor that is an NPN type transistor, wherein an emitter is connected between the first and second direct current power sources, and a collector is connected to a base of the first transistor;
a first base current controlling resistor adjusting a base current of the second transistor;
a detecting coil positioned in a magnetic field of the permanent magnets and provided between a base and an emitter of the second transistor;
a first diode in which an anode is connected to the base of the second transistor and a cathode is connected to the detecting coil, wherein the first diode controls and adjusts the base current of the second transistor such that the second transistor is turned on when a reverse voltage is applied by induced electromotive force generated in the detecting coil and such that the second transistor is turned off when a forward voltage is applied by the induced electromotive force of the detecting coil;
a third transistor that is an NPN type transistor, wherein an emitter is connected to the negative side of the second direct current power source, and a collector is connected to the other end of the drive coil;
a fourth transistor that is a PNP type transistor, wherein an emitter is connected between the first and second direct current power sources, and a collector is connected to a base of the third transistor;
a second base current controlling resistor adjusting a base current of the fourth transistor; and
a second diode in which an anode is connected to the detecting coil and the cathode of the first diode, and a cathode is connected to a base of the fourth transistor, wherein the second diode controls and adjusts the base current of the fourth transistor such that the fourth transistor is turned on when a reverse voltage is applied by induced electromotive force generated in the detecting coil and such that the fourth transistor is turned off when a forward voltage is applied by the induced electromotive force of the detecting coil.

* * * * *